Dec. 2, 1930.   W. B. RAYTON   1,783,481

CONDENSING LENS SYSTEM

Filed Nov. 30, 1929

WILBUR B. RAYTON
INVENTOR

BY *G. A. Ellestad*

ATTORNEY

Patented Dec. 2, 1930

1,783,481

UNITED STATES PATENT OFFICE

WILBUR B. RAYTON, OF ROCHESTER, NEW YORK, ASSIGNOR TO BAUSCH & LOMB OPTICAL COMPANY, OF ROCHESTER, NEW YORK, A CORPORATION OF NEW YORK

CONDENSING LENS SYSTEM

Application filed November 30, 1929. Serial No. 410,755.

This invention relates to the art of optical projection and more particularly it has reference to a condensing lens system which may be used for projecting motion pictures and the like.

One of the objects of this invention is to provide a condensing lens means which will have different focal lengths in different meridians and will have an average correction for spherical aberration. Another object is to provide an improved condensing system which will function to efficiently illuminate a relatively long, narrow object, such as a motion picture frame, for example. These and other objects and advantages reside in certain novel features of construction, arrangement and combination of parts as will hereinafter be more fully described and pointed out in the appended claims.

Referring to the drawings.

Figure 1:
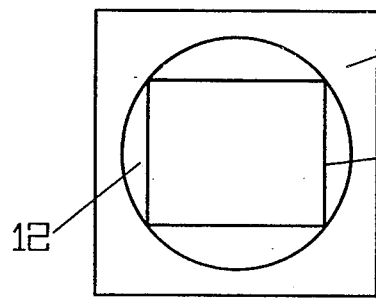
Figs. 1 and 2 illustrate the operation of prior art devices.

In projecting motion pictures of the standard commercial size, as well as those of the sub-standard or amateur size, satisfactory illumination of the film may be obtained by using condensing lenses, having only spherical and plano surfaces, in conjunction with light sources such as incandescent lamps or arc lights which require a comparatively safe and moderate supply of electric current. Under the prevailing practice, each frame of the motion picture film comprises a picture area which is very nearly square, the ratio of the height to the width usually being about as 4 is to 5. The illumination of such picture areas by prevailing devices is illustrated in Fig. 1 wherein 10 indicates the aperture plate having the picture aperture 11. The illuminating system, commonly employed, projects a round spot of light, indicated at 12, onto the aperture plate 10 so as to circumscribe the aperture 11. The light which falls on the plate outside of the aperture 11 is, of course, wasted insofar as the projected picture is concerned.

It has recently been proposed to adopt a larger motion picture film having a larger picture area and adapted for projection of a larger picture on the screen in a theatre. In some of these proposed films the height of the picture area has been increased 25% and the width has been increased nearly 100% so that the ratio of the height to the width is about as 1 is to 2. The projection of such enlarged pictures makes unusual demands upon the illuminating system as a much greater amount of light is required in order to project a picture having a satisfactory and sufficient brightness. The increased amount of light required can be partially obtained by increasing the current consumption of the light source, after which, any additional brightness of the projected picture can only be obtained by increasing the optical efficiency of the condensing lens system.

The usual type of condensing lens system, having spherical or a combination of spherical and plano surfaces, does not, for several reasons, function to efficiently illuminate the proposed enlarged picture areas. In the first place, such condensing lenses are characterized by large amounts of spherical aberration as a result of which a great deal of light is lost. Furthermore, a very definite limit to the angle of the cone of light which can be collected by the condenser and transmitted to the picture area is set by the spherical aberration and by the fact that since the focal length depends upon the radius of curvature, there is a definite limit to the diameter attainable in a lens of a given focal length. Finally, the spot of light that is produced on the aperture plate by the ordinary condenser and light source is substantially round, as illustrated in Fig. 1.

Figure 2:
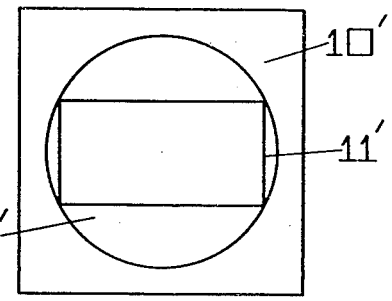

If a circle is circumscribed about a rectangle whose ratio of height to width is as 1 is to 1.5 or as 1 is to 2, the total area of the segments of the circle which are outside of the rectangle becomes considerable in proportion to the area of the rectangle. This is illustrated in Fig. 2 which shows the result when the usual condenser system, projecting a round spot of light 12' onto the aperture plate 10', is used to illuminate the enlarged picture area which is in register with aperture 11' whose width is about twice as great as its height. It will be apparent fom Fig. 2 that a large amount of light transmitted by the condensing system does not fall on the picture area but impinges upon the aperture plate adjacent the aperture 11'. Besides the loss of light, a further disadvantage results from such an arrangement due to the fact that the great amount of light which strikes the aperture plate 10' causes an undue heating effect so that fire hazards are increased.

By means of my improved condensing lens system, however, I am able to overcome the hereinbefore mentioned difficulties and disadvantages which arise when an attempt is made to illuminate, for example, an enlarged picture area having a greater difference between height and width than exists in the present commonly used commercial and amateur standard films.

To accomplish the desired results, my invention comprises the use of a combination including aspheric and cylindrical surfaces or a combination including aspheric and toric surfaces.

Figure 3:
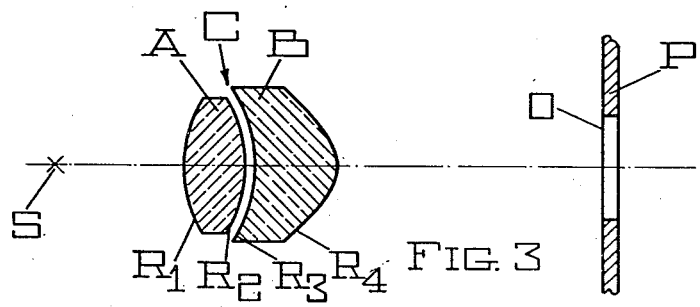
Fig. 3 is a vertical axial section of a device embodying my invention.
Figure 4:
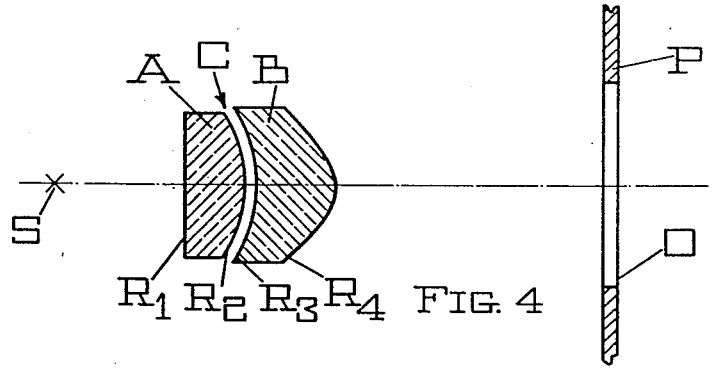
Fig. 4 is a horizontal axial section of the same.

One form of my invention is shown in Figs. 3 and 4 of the drawings, which illustrate, respectively, a vertical axial section and a horizontal axial section of an apparatus embodying my invention. In this form, the condensing lens system C comprises two spaced lens elements A and B by means of which light from the source S is projected onto the aperture plate P having the opening O. The surface $R_1$, of the lens A is of a cylindrical form with its axis lying in a horizontal plane, while the inner surface $R_2$ of lens A is spherical. The inner surface $R_3$ of lens B is spherical whereas the outer surface $R_4$ of lens B is parabolic.

Figure 5:
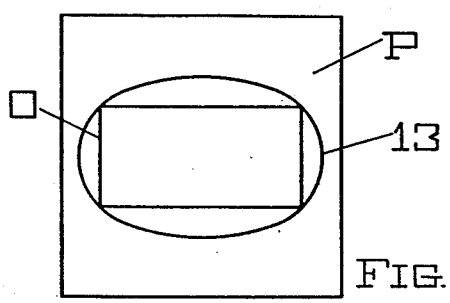
Fig. 5 illustrates the operation of my improved device.

The combination of the lens elements having a cylindrical and a parabolic surface provides an efficient condensing system which has different focal lengths in different meridians while at the same time the system has an average correction for spherical aberration. Such a condensing system projects onto the aperture plate P a spot of light which is substantially oval or elliptical in shape as shown at 13 in Fig. 5. Since the shape of the light spot 13 quite closely approximates the shape of the aperture O, less light is lost with this system than with the usual type of condenser employed. Furthermore, the system has an average correction for spherical aberration in different meridians so that a condenser of this type functions very efficiently to illuminate, for example, an aperture whose width is about twice as great as its height. Moreover, since the curvature of the aspheric surface decreases progressively from the center to the margin, I am able, for a given focal length, to provide a lens of larger diameter than would be possible with a spherical surface, thereby permitting the condenser system to collect more light from the source.

Although I have shown my invention as applied to a two-lens condensing system, it may be applied to systems comprising more than two lens elements or it may be applied to a single lens element. It is also to be understood that instead of using a cylindrical surface, I may use any other surface having different curvatures in different meridians, such as a toric surface, for example. Similarly, although I have illustrated the use of a parabolic surface, I may use any other suitable type of aspheric surface of revolution.

From the foregoing, it will be apparent that I am able to attain the objects of my invention and provide an improved condensing lens system which will have different focal lengths in different meridians and will be corrected for spherical aberration whereby a substantially elliptical or oval spot of light may be projected with maximum efficiency. Various modifications can obviously be made without departing from the spirit of my invention as pointed out in the appended claims.

I claim:

1. A condensing lens system for illuminating a relatively long, narrow aperture, said system comprising two spaced lens elements, one of said elements having an aspheric surface of revolution, the other of said elements having a cylindrical surface.

2. A condensing lens system for projecting an oval spot of light, said system comprising a plurality of lens elements, one of said elements having an aspheric surface of revolution, another of said elements having a surface whose curvature is different in different meridians.

3. A condensing lens means having different focal lengths in different meridians, said means comprising a refractive substance, the boundary surfaces of said substance comprising an aspheric surface of revolution and a surface whose curvature is different in different meridians.

4. A spherically corrected condensing lens system having different focal lengths in different meridians, said system comprising two spaced lens elements, one of said elements having a cylindrical surface, the other of said elements having a parabolic surface.

5. In a projection apparatus, the combination of a light source, an aperture plate having a substantially rectangular opening, one side of said opening being at least one and one-half times longer than another side, and a condensing lens system disposed between said light source and said aperture plate, said system comprising a plurality of lens elements, one of said elements having an aspheric surface of revolution, another of said elements having a surface whose curvature is different in different meridians.

WILBUR B. RAYTON.